United States Patent [19]

Boeckmann et al.

[11] Patent Number: 4,555,597

[45] Date of Patent: Nov. 26, 1985

[54] TRANSIENT RESISTANT KEY OPERATED PULSE GENERATING CALLING DEVICE CIRCUIT

[75] Inventors: Eduard F. B. Boeckmann; Larry A. Woodworth, both of Huntsville, Ala.

[73] Assignee: GTE Business Communication Systems Inc., Northlake, Ill.

[21] Appl. No.: 558,130

[22] Filed: Dec. 5, 1983

[51] Int. Cl.[4] .................. H04M 1/31; H04M 1/274
[52] U.S. Cl. ........................ 179/90 B; 179/90 BD; 179/90 K; 179/81 R
[58] Field of Search ........... 179/90 B, 90 BB, 90 BD, 179/90 K, 90 R, 81 R

[56] References Cited
U.S. PATENT DOCUMENTS

| | | | |
|---|---|---|---|
| 4,209,668 | 6/1980 | Weinberger et al. | 179/90 B |
| 4,223,186 | 9/1980 | Hartmann | 179/90 K |
| 4,232,200 | 11/1980 | Hestad et al. | 179/90 K |
| 4,267,409 | 5/1981 | Baldoni | 179/90 B |
| 4,329,546 | 5/1982 | Montesi et al. | 179/81 R |
| 4,388,499 | 6/1983 | Janssen | 179/81 R |
| 4,413,159 | 11/1983 | Huizinga et al. | 179/90 K |

Primary Examiner—Thomas W. Brown
Assistant Examiner—Elio DiVito
Attorney, Agent, or Firm—Robert J. Black; Gregory G. Hendricks

[57] ABSTRACT

A protective circuit consisting of two diodes which functions along with other external circuit elements to provide protection against transients for an integrated circuit utilized to generate dial pulses in an electronic telephone circuit. By means of included diodes, excessive transients are prevented from entering the integrated circuit internal circuitry and disturbing the memory included therein or other operational characteristics.

4 Claims, 1 Drawing Figure

U.S. Patent    Nov. 26, 1985    4,555,597
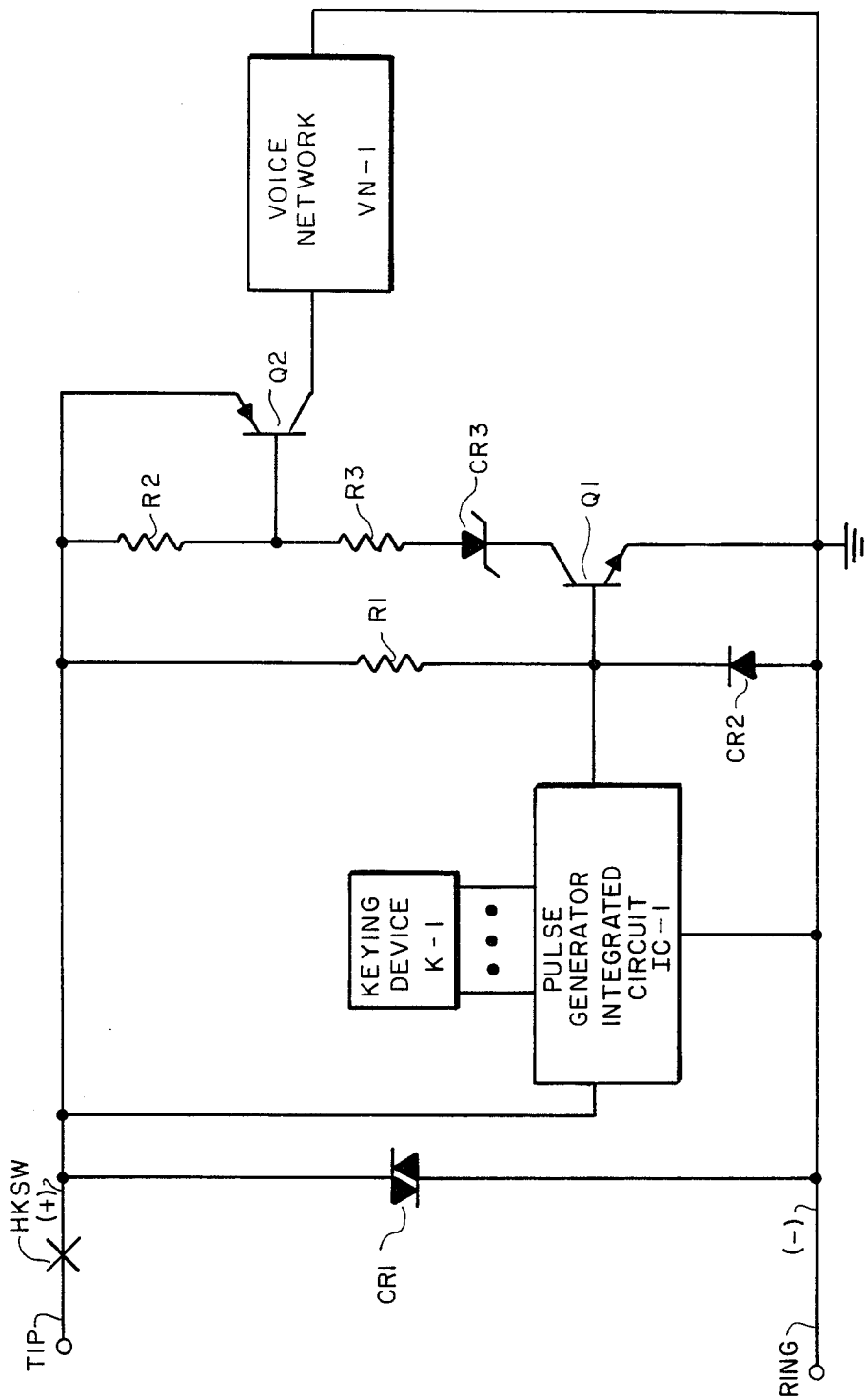

TRANSIENT RESISTANT KEY OPERATED PULSE GENERATING CALLING DEVICE CIRCUIT

BACKGROUND OF THE INVENTION

1. Technical Field

The present invention relates to the generation of pulse sequences for use in telephone signalling and, more particularly, to circuitry for improving the reliability of pulse sequences in telephones wherein the pulses are generated by key operated calling devices, and, more particularly, for those telephones that include circuitry requiring a memory function, e.g., last number redial, and repertory dialing.

2. Background Art

Since the invention of electronic telephones that simulate the mechanical switching action of the typical rotary dial telephone, a number of manufacturers have designed circuits that provide dial pulses, a muting function and sometimes memory and other control functions. Such circuits have recently been implemented as integrated circuits; MOSTEK MK50981 and MK5175 units being typical of such devices. Numerous other manufacturers also have provided similar integrated circuit units. These devices have proven to be reliable except under certain conditions where the devices can be subject to temporary loss of memory or false output of data. One cause of such malfunction is found to be due to transients fed back through the external switching components into the integrated circuit. These transients may be external to the telephone or they may be the result of the telephone dial pulses under certain conditions, such as may be present with extra high telephone line voltage, etc. Previously utilized techniques to overcome the outlined problem have included the use of a varistor or other surge protection device connected between the positive and negative supply lines to the integrated circuit. Such varistor units are used to protect against surges, such as a lightning surge or other gross fault condition. However, a better protection method for the pulse feedback problem and other type of transients is required. Accordingly, it is the object of the present invention to improve the reliability of operation of the telephone, especially as related to problems caused by pulse feedback. cl SUMMARY OF THE INVENTION The present invention consists of an electronic telephone, including a key operated pulse generating calling device integrated circuit, and includes a diode clamp applied to the integrated circuit pulse generating device output and connected with its anode to the associated power supply common lead. Also included is a Schottky diode in the pulse signal output circuit to a network switching transistor. Each diode provides a certain amount of protection on its own to the included circuitry and in combination provide maximum protection. The first diode insures that no voltage in excess of approximately 1 volt negative will appear on the integrated circuit pulse output terminal, due to the diode clamping action. The second diode in the pulse signal path to the transistor switch blocks negative current transients in the signal path, essentially blocking negative pulse feedback.

In operation, the protective devices can be thought of as one-way valves permitting the flow of positive current but shunting and blocking, respectively, negative transient currents. In operation, when the integrated output goes to a "high logic" condition (a positive voltage of approximately 1 volt) signalling the first of two transistors to an "on" state, the first diode does not interfere and the second diode allows conduction, to bias the final switching transistor to an "off" state, disconnecting the voice network in the telephone to produce the dial pulse. When the network is disconnected, inductive effects will generate a negative voltage on the switching transistor that would otherwise travel into the signal path and back into the integrated circuit. The Schottky diode blocks the negative transient. If any voltage still gets through to the first diode from the integrated circuit pulse output, the diode will shunt the remaining voltage to common, thereby by-passing the internal circuitry of the integrated circuit. The inclusion of the Schottky diode is also found to improve the alternating current impedance of the pulse network.

BRIEF DESCRIPTION OF THE DRAWING

The single FIGURE of the attached drawing comprises a simplified block and schematic diagram of a subscriber's telephone circuit, including a key operated pulse generating calling device circuit with auxilliary circuitry providing resistance to transients in accordance with the present invention.

DESCRIPTION OF THE PREFERRED EMBODIMENT

Referring now to to the FIGURE, a simplified schematic and block diagram of the invention as embodied in a typical electronic telphone is shown. Included are leads T and R which connect normally to a telephone line extending to a private branch or telephone central office. Included in the T or positive lead is a hook-switch HKSW shown in the off-hook or operated position. Connected across the T and R leads is varistor CR1 utilized and applied in much the way as is common to the telephone art. Also connected across leads T and R is a pulse generator integrated circuit IC-1, which as indicated previously may be a MOSTEK, MK50981 or MK5175 integrated circuit. Connected to the integrated circuit IC-1 is keying device K-1 which may be any keying device of the type currently available in the state-of-the-art merely providing an appropriate output closure for each digit from 0 through 9 and such additional input signals as may be required. Diode CR2 is a silicon diode and in combination with diodes CR3, which is a silicon Schottky diode, comprise the subject of the present invention when included in a state-of-the-art telephone circuit like that shown in the accompaning drawing. Resistors R1, R2 and R3 are biasing elements for switching transistors Q1 and Q2. It should be noted that transistor Q2 is the final switch and raises the telephone's impedance to the "break" impedance portion of the dial pulse sequence by momentarily disconnecting the voice network VN-1 from the line (T and R). Diode CR3 blocks negative transients fed back from the switched elements of the telephone loop and voice networks during dialing, such as hook-switch transitions or negative transients on the tip (T) portion of the telephone line. A polarity guard, or bridge rectifier, usually included, is not shown for purposes of simplicity. Likewise, mute circuitry frequently found in connection with such pulse generator integrated circuits is also not shown, inasmuch as it does not form a portion of the present invention.

In the arrangement shown, diode CR2 prevents negative transients of more than one volt and positive transients greater than 70 volts, approximately, from entering the pulse output portion of the pulse generator integrated circuit IC-1.

To summarize the operation of the present invention, a diode clamp consisting of diode CR2 is applied to the pulse output portion of the pulse generator integrated circuit IC-1, thus preventing excessive transients from entering the integrated circuits internal circuitry and disturbing its memory or operational characteristics. A Schottky diode CR3 is employed as a high-speed negative current blocking element in the pulse signal bias path, thus preventing negative current feedback, as well as improving the AC impedance.

While but a single embodiment has been shown, it will be obvious to those skilled in the art that numerous modifications may be made without departing from the spirit and scope of the present invention which shall be limited only by the claims appended hereto.

What is claimed is:

1. A subscriber's telephone circuit connected to a telephone line and including: a voice network; switching means operated to connect said telephone line to said voice network and, in the alternative, to disconnect said telephone line from said voice network; a pulse generator, including circuit connections to said telephone line and an output connection to said switching means; key means connected to said pulse generator manually operated to cause said pulse generator to periodically operate said switching means; and first and second unidirectional conducting means, including circuit connections to a pulse generator output means operated to prevent transients from entering said pulse generator via an output circuit connection; said first uni-directional conducting means comprising a diode connected between said pulse generator output connection and said telephone line and said second uni-directional conducting means comprising a SCHOTTKY diode included in said switching means.

2. A subscriber's telephone circuit as claimed in claim 1, wherein: said pulse generator comprises an integrated circuit.

3. A subscriber's telephone circuit as claimed in claim 1, wherein: said switching means include first and second transistors.

4. A subscriber's telephone circuit as claimed in claim 3, wherein: said first transistor includes a circuit connection to said pulse generator output connection and said second transistor includes a circuit connection to said voice network.

* * * * *